United States Patent [19]

Bartel et al.

[11] 4,353,646

[45] Oct. 12, 1982

[54] APPARATUS FOR POSITIONING ORIGINALS IN PHOTOGRAPHIC COPYING MACHINES

[75] Inventors: Siegfried Bartel, Gauting; Ernst Biedermann, Taufkirchen; Erich Nagel, Anzing; Franz Kramer, Munich, all of Fed. Rep. of Germany

[73] Assignee: AGFA-Gevaert Aktiengesellschaft, Leverkusen, Fed. Rep. of Germany

[21] Appl. No.: 291,184

[22] Filed: Aug. 7, 1981

[30] Foreign Application Priority Data

Aug. 14, 1980 [DE] Fed. Rep. of Germany ....... 3030901

[51] Int. Cl.³ ............................................ G03B 27/62
[52] U.S. Cl. ........................................ 355/76; 353/95
[58] Field of Search ....................... 355/75, 76; 353/95

[56] References Cited

U.S. PATENT DOCUMENTS

| | | | |
|---|---|---|---|
| 2,110,475 | 3/1938 | Schubert | 355/76 |
| 2,199,305 | 4/1940 | Dewey | 355/75 |
| 2,257,444 | 9/1941 | Abadjieff | 355/75 |
| 2,741,154 | 4/1956 | Ludwig | 355/76 |
| 2,803,164 | 8/1957 | Lehv | 355/76 |
| 2,995,979 | 8/1961 | Gordon et al. | 355/75 |
| 4,161,365 | 7/1979 | Anderson et al. | 355/75 |

*Primary Examiner*—Monroe H. Hayes
*Attorney, Agent, or Firm*—Kontler, Grimes & Battersby

[57] ABSTRACT

Apparatus for positioning sheet-like or strip-shaped originals in a photographic copying machine has a horizontal table with a large window for transmission of copying light and a removable or exchangeable holder on the table. The holder has a lower section which rests on the table and has a first opening in register with the window, an upper section one marginal portion of which is pivoted to the corresponding marginal portion of the lower section, which is movable to and from an operative position of overlap with the lower section and which has a second opening in register with the first opening when the upper section assumes its operative position, and an elastic hold-down device which is affixed to the upper side of the lower section and has an open-sided cutout in register with the first opening. An original is insertable between the hold-down device and the lower section so that a selected portion of the original registers with the cutout and the hold-down device biases three sides of such selected portion against the upper side of the lower section. The upper section has an L-shaped elastic biasing element one leg of which extends downwardly through the second opening and along the open side of the cutout to urge the remaining side of the selected portion of a properly inserted original against the lower section as soon as the upper section is moved to its operative position. The upper section can carry additional biasing elements which bear against the hold-down device along the remaining two closed sides of the cutout to urge the respective sides of the selected portion of the original against the lower section as soon as the upper section assumes its operative position.

25 Claims, 2 Drawing Figures

4,353,646

APPARATUS FOR POSITIONING ORIGINALS IN PHOTOGRAPHIC COPYING MACHINES

BACKGROUND OF THE INVENTION

The present invention relates to apparatus for positioning sheet-like or strip-shaped commodities, such as sheet-like or strip-shaped originals in photographic copying machines. More particularly, the invention relates to improvements in replaceable or exchangeable apparatus for positioning such commodities on the table of a copier or the like.

Positioning apparatus as used in photographic copying machines to properly locate an original with reference to the plane of the image-receiving sheet as well as with reference to the light source and optical system of the copying machine. The arrangement is normally such that the original to be copied is inserted (e.g., by hand) between a platform which constitutes the lowermost component of the holder for originals and a hold-down device which, in turn, is overlapped by a cover. The latter is normally coupled to the platform so that it can be pivoted to and from a position in which it overlies the platform and the hold-down device. The purpose of the hold-down device and of the cover is to ensure that the original is held in requisite position, at least during the interval of exposure to copying light, so as to enable the machine to make sharp reproductions of one or more selected portions of or of the entire original. If the originals are introduced and removed by hand, the apparatus should be designed with a view to allow for rapid positioning of successive originals with a requisite degree of accuracy so as to ensure that little time will be wasted between the making of successive exposures.

In a presently known positioning apparatus which is manufactured and sold by the assignee of the present application and is used in a copying machine which can make larger or smaller reproductions, the hold-down device is installed at one side of the opening in the platform of the holder, namely, at that side which is nearest to the hinge or hinges between the platform and the cover. The hold-down device is formed with an elongated locating edge against which a portion of the original abuts when the original is properly positioned on the platform. Such apparatus are quite satisfactory if the originals are flat, i.e., if the originals do not exhibit any or do not exhibit a pronounced tendency to curl. However, exposed and developed photographic films which are supplied to the copying machine in the form of long strips consisting of a series of spliced-together customer films will curl as soon as allowed, i.e., in the absence of a force which holds them in a predetermined plane. Such tendency of photographic films to curl is not characteristic only of elongated strips, i.e., of webs each of which constitutes an entire customer film or a series of serially connected customer films, but also of relatively short film sections each of which consists of a few film frames as well as of individual film frame. Relatively short sections are formed preparatory to shipment of exposed and developed films back to the customers or to the dealers.

It has been found that, when a relatively short section of sheet-like or strip-shaped material is placed against the aforementioned locating edge of the hold-down device in a conventional positioning apparatus and the cover is thereupon placed over the hold-down device, the cover often shifts the inserted original with reference to the hold-down device so that the openings of the platform and cover are not in accurate register with a selected portion (e.g., a particular film frame) of the inserted original. Moreover, the insertion and proper positioning of curled originals into an apparatus of the above outlined character is rather time-consuming and difficult because, when an original overlies the opening of the platform, the outline of such opening cannot be readily seen through the original so that the person in charge must devote much attention to proper positioning of the original with reference to the platform and with reference to the hold-down device.

OBJECTS AND SUMMARY OF THE INVENTION

An object of the invention is to provide a novel and improved positioning apparatus which can be used for retention of sheet-like commodities in selected positions and in selected planes for desired intervals of time regardless of whether or not such commodities exhibit a tendency to curl.

Another object of the invention is to provide a positioning apparatus wherein an original can be rapidly moved to requisite position with little loss in time and by persons who need not be highly skilled in the art of photography or copying.

A further object of the invention is to provide a positioning apparatus which is especially suited for use in photographic copying machines as a means for holding successive originals or successive segments of an original in an optimum position for reproduction of the images of such originals onto photographic paper or the like.

An additional object of the invention is to provide an apparatus of the above outlined character wherein the movement of its cover to operative position does not entail any undesirable shifting of the inserted original.

Another object of the invention is to provide the apparatus with a novel and improved hold-down device for originals.

A further object of the invention is to provide the apparatus with a novel and improved cover.

An ancillary object of the invention is to provide the apparatus with novel and improved means for guiding the holder in its support, such as the table of a photographic copying machine.

Another object of the invention is to provide the positioning apparatus with novel and improved means for reliably holding an inserted original all the way around that portion which is to be reproduced on photographic paper or the like.

Still another object of the invention is to provide an apparatus which can be readily installed in existing photographic copying machines as a superior substitute for heretofore known positioning apparatus.

The invention is embodied in an apparatus for positioning sheet-like commodities, particularly for positioning originals (e.g., frames of exposed and developed photographic films) in photographic copying machines, especially in copying machines of the type wherein the originals are normally inserted, shifted and/or removed by hand. The apparatus comprises a support (e.g., a horizontal table having a relatively large window for the passage of copying light), and a novel and improved holder on the support. The holder comprises a preferably plate-like first section or platform which is carried by (preferably releasably mounted on top of) the support and has a first opening in register with the window of the support, and a substantially plate-like second section which is movable with reference to the first section to and from an operative position in which the second section overlies the first section. The second section has a second opening which registers with the first opening in the operative position of the second section, and the improved holder further comprises a substantially U-shaped and preferably flat or substantially flat hold-down device which is interposed between the first and second sections and has an open-sided cutout in register with the first opening. A commodity which is to be copied can be placed between the hold-down device and the first section so that a selected portion of the inserted commodity overlies the first opening and three sides of such selected portion of the inserted commodity are biased by the hold-down device against the first section. The improved holder also comprises a biasing element (e.g., a substantially L-shaped member) which is provided on the second section and extends along the open side of the cutout in the hold-down device in the operative position of the second section to urge the remaining side of selected portion of the commodity between the hold-down device and the first section against the first section. This means that the entire selected portion of a properly inserted commodity is urged against the first section in the region extending all the way around the first opening as soon as the second section is moved to its operative position.

The hold-down device preferably consists of sheet steel or another suitable elastomeric material, and the holder preferably further comprises fastener means for securing the hold-down device to the first section so that the hold-down device bears against the first section in the region of the cutout, i.e., the hold-down device can be mounted in prestressed condition so that it bears against a commodity which is inserted between such device and the upper side of the first section.

The biasing element comprises or may comprise an elastic portion (e.g., one leg of the aforementioned L-shaped member) which can extend through the second opening and toward the first section in the operative position of the second section so as to bear against the adjacent portion of a properly inserted commodity and to urge such portion of the commodity against the upper side of the first section.

The holder preferably further comprises one or more hinges or analogous means for articulately connecting one marginal portion of the preferably square or rectangular second section to the first section or directly to the support so that the second section can be pivoted to and from its operative position.

That (closed) side of the cutout in the hold-down device which is located opposite the open side of the cutout (the cutout is preferably square or rectangular, the same as the first and second openings and the window) is preferably adjacent to and substantially parallel with an elongated strip-shaped portion of the hold-down device, and the holder preferably further comprises fastener means for permanently or separably securing the strip-shaped portion of the hold-down device to the first section. The hold-down device further comprises two elastic prongs which flank the cutout and extend between the aforementioned open and closed sides of the cutout, preferably substantially at right angles to the longitudinal direction of the strip-shaped portion. The prongs are preferably integral with the strip-shaped portion of the hold-down device.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
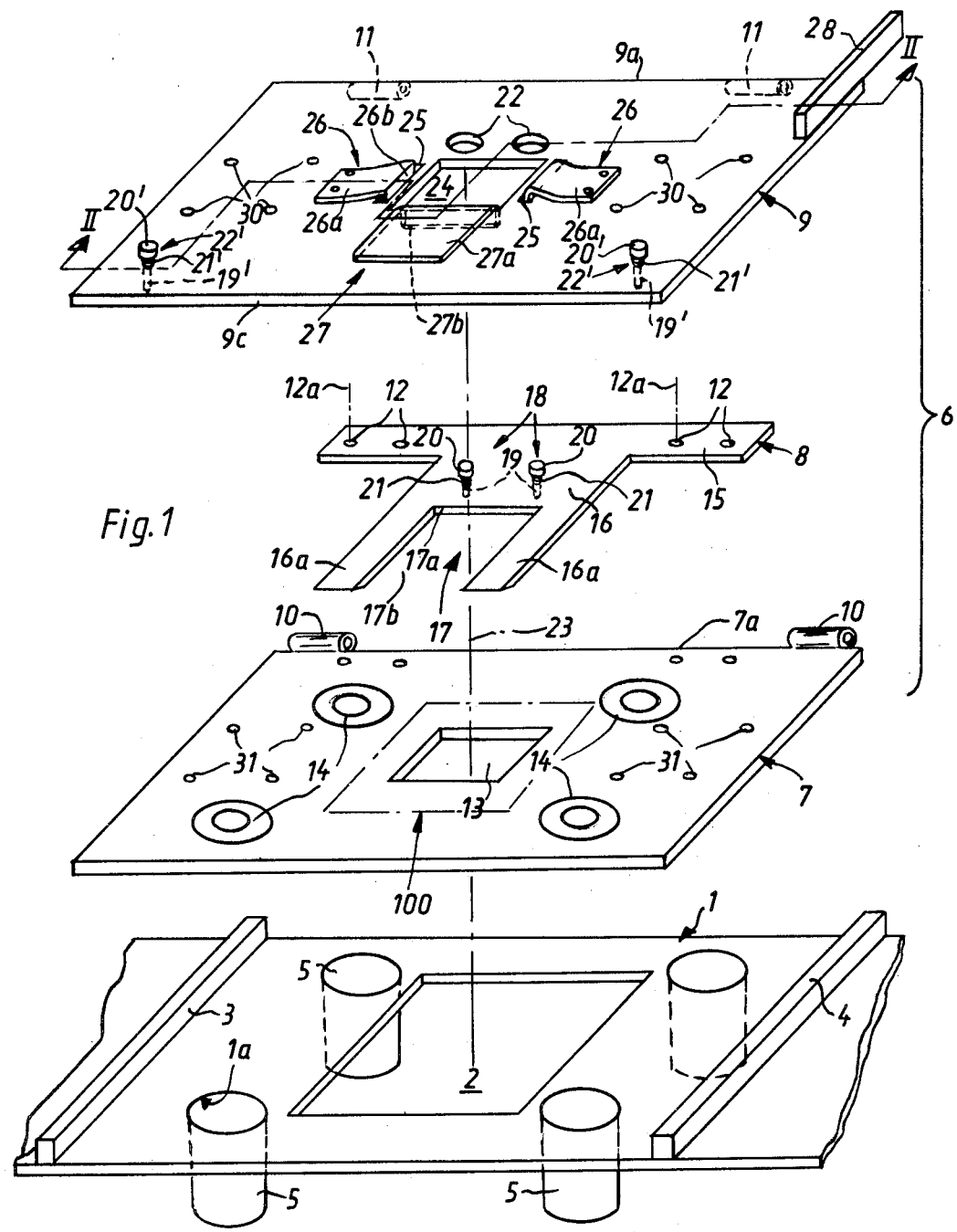
FIG. 1 is an exploded perspective view of an apparatus which embodies one form of the invention, an original being shown by phantom lines between the underside of the hold-down device and the upper side of the first section of the improved holder.
Figure 2:
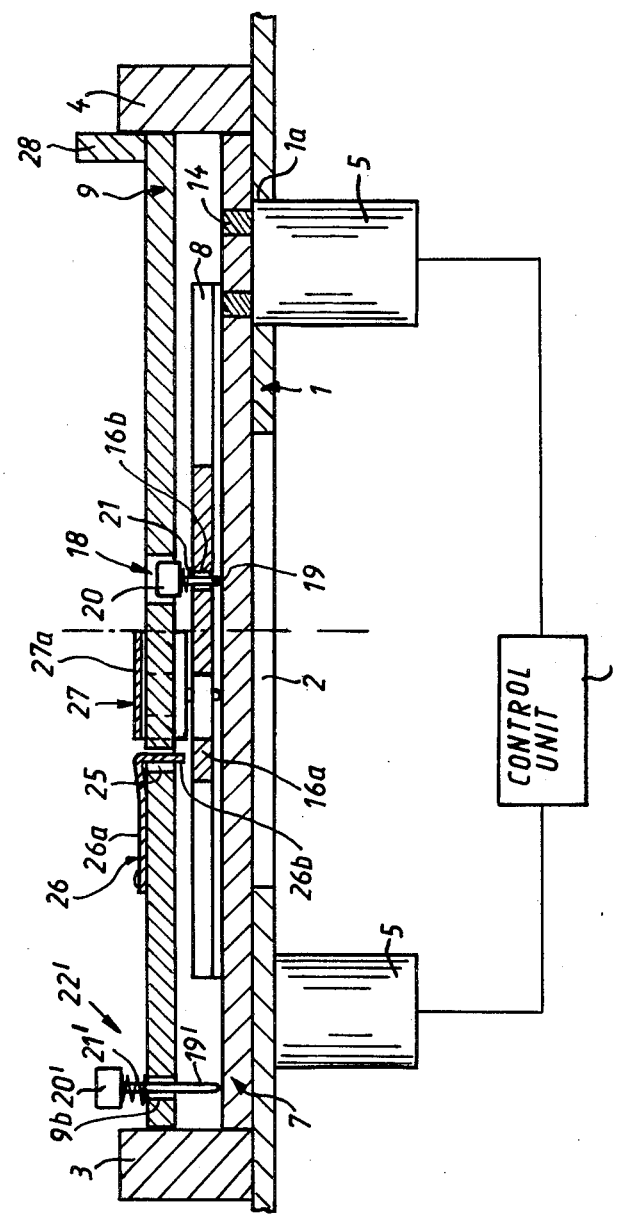
FIG. 2 is a composite vertical sectional view of the assembled apparatus substantially as seen in the direction of arrows from the line II—II of FIG. 1.

The positioning apparatus which is shown in FIGS. 1 and 2 comprises a support or table 1 which can form part of or is installed in a photographic copying machine and is located in a substantially horizontal plane. A centrally located window 2 of the support 1 serves for admission of copying light for the largest prints which are contemplated and the upper side of the support 1 carries two spaced-apart parallel elongated guide rails 3 and 4 which flank the window 2 and serve to facilitate the insertion and positioning of a novel and improved exchangeable holder 6 including a first or lower section 7, a second or upper section 9 and a substantially U-shaped hold-down device 8 which is adjacent to the upper side of the first section 7. When the second section 9 is moved to the operative position which is shown in FIG. 2 and in which the section 9 overlies the first section 7, each of these sections is located in the space between the two guide rails 3 and 4. The manner in which the lower section 7 is held against movement with reference to the support 1 as considered in the longitudinal direction of the guide rails 3 and 4 is not specifically shown in the drawing. It is clear that the section 7 can be provided with downwardly extending flanges replacing the guide rails 3, 4 and receivable in complementary grooves in the upper side of the support 1 to hold the first section 7 against movement in a direction to the right or to the left, as viewed in FIG. 2. Still further, the underside of the first section 7 can be formed with parallel grooves for complementary projections at the upper side of the support 1.

Each of the sections 7 and 9 has a substantially rectangular outline, and the support 1 has four relatively large holes 1a, one at each of the four corners of the section 7. Each of the holes 1a receives the uppermost portion of a discrete electromagnet 5, and the four electromagnets form part of the means for forcing or urging the adjacent portions of the second section 9 against the upper side of the first section 7 when the second section assumes the operative position of FIG. 2. To this end, at least certain portions of the section 9 consist of a suitable magnetizable material, and the section 7 has four magnetizable portions in the form of annular inserts 14 consisting of soft iron or the like.

The electromagnets 5 are connected to a control unit 105 which energizes the electromagnets, at least during the making of an exposure, so that the second section 9 is then urged against the first section 7 which, in turn, is attracted by the electromagnets 5 so that it bears against the upper side of the support 1. The manner in which the control unit 105 receives signals to energize the electromagnets 5 during the making of an exposure and when the second section 9 is held in the operative position of FIG. 2 is not specifically shown in the drawing.

That elongated marginal portion (7a) of the substantially rectangular first section 7 which is remote from the observer of FIG. 1 carries two spaced-apart aligned sleeves 10 forming part of two leaves of a hinge. Similar leaves with sleeves 11 are provided on the adjacent marginal portion 9a of the second section 9. A one-piece or composite pintle (not shown) which is inserted into the sleeves 10 and 11 constitutes with the four leaves a hinge which articulately connects the marginal portion 9a to the marginal portion 7a so that the second section 9 can be pivoted to and from the operative position of FIG. 2.

The hold-down device 8 of the holder 6 has an elongated strip shaped portion 15 which is formed with holes 12 for the shanks of screws of analogous fasteners 12a (indicated by phantom lines) serving to separably or more or less permanently attach the portion 15 to the upper side of the first section 7. The hold-down device 8 further comprises a second portion or leaf 16 which is preferably integral with the strip-shaped portion 15 and defines an open-sided square or rectangular cutout 17 in register with a first opening 13 provided in the central portion of the first section 7 as well as with a second opening 24 provided in the central portion of the section 9 and registering with the opening 13 when the section 9 is held in its operative position. The cutout 17 has a closed side 17a which is spaced apart from and parallel to the open side 17b, and this cutout is flanked by two elongated parallel prongs or extensions 16a of the portion 16. At least the prongs 16a consist of elastomeric material and the manner in which the fasteners 12a secure the strip-shaped portion 15 to the section 7 is preferably such that the prongs 16a bear against the upper side of the section 7.

Thus, when a flat sheet-like commodity 100, such as a frame of an exposed and developed film, is slipped between the portion 16 of the hold-down device 8 and the section 7, a selected portion of such commodity or original can be moved into register with the opening 13 so that it is exposed to copying light during the making of a reproduction of the image on such selected portion onto a strip of photographic paper or the like. The distance between the open side 17b of the cutout 17 and the closed side 17a preferably exceeds the corresponding dimensions of the openings 13 and 24 in the sections 7 and 9.

The entire hold-down device 8 can be made of a single piece of spring steel or the like.

The portion 16 of the device 8 is formed with two holes 16b (one shown in FIG. 2) for means 18 which yieldably urges the portion 16 away from the upper side of the first section 7. Such urging means 18 comprises two pins or posts 19 having heads 20 and being biased by springs 21 so that the tips of the posts 19 bear against the upper side of the section 7 and tend to push the underside of the portion 16 away from such upper side. The illustrated urging means 18 can be replaced by a modified urging means including the posts 19, lateral projections on such posts, and springs interposed between the lateral projections and the underside of the portion 16. When the section 9 is moved to the operative position of FIG. 2, it urges the portion 16 against the upper side of the section 7. The holes 22 in the section 9 serve to receive the heads 20 with at least some clearance (see FIG. 2) when the section 9 is moved to its operative position.

Those corners of the section 9 which are remote from the marginal portion 9a are formed with holes 9b (one shown in FIG. 2) for the posts 19' of means 22' which serve to yieldably urge the marginal portion 9c of the section 9 away from the upper side of the section 7. The urging means 22' are at least substantially identical with the urging means 18 and each thereof also comprises a head 20' for the respective post 19' as well as a spring 21' urging the tip of the post 19' against the upper side of the section 7. The urging means 22' serve to lift parts of the marginal portion 9c away from the section 7, at least when the electromagnets 5 are deenergized, to allow for convenient grasping of the section 9 preparatory to pivoting of this section to its inoperative or raised position.

In accordance with a feature of the invention, the holder 6 further comprises an element 27 which biases a properly inserted and positioned commodity 100 against the upper side of the section 7 in the region of the open side 17b of the cutout 17 in the portion 16 of the hold-down device 8. The element 27 preferably consists of an elastomeric material and resembles a substantially L-shaped body having a first leg 27a secured to the upper side of the section 9 (it being assumed that the section 9 (it being assumed that the section 9 is held in the operative position) and a second portion or leg 27b which extends through the opening 24 of the section 9 and bears against the upper side of the section 7 or against the adjacent part of the properly inserted commodity 100. The leg 27b then extends transversely of and between the prongs 16a. When the commodity 100 is properly inserted between the hold-down device 8 and the section 7, and the section 9 is moved to its operative position, that selected portion of the commodity which overlies the opening 13 of the section 7 is surrounded by the web of the portion 16 in the region of the closed side 17a, by the two prongs 16a, and by the lower edge portion of the leg 27b. This ensures that the commodity 100 (or at least that portion of the commodity which overlies the opening 13) is held in an optimum position for exposure of its image onto a sheet of photographic paper or the like.

The phantom line 23 denotes the optical axis of the copying machine. The centers of the openings 13, 24 are located on such axis. The dimensions of the window 24 determine the size of that portion of a properly inserted commodity 100 whose image will be reproduced in the copying machine when the window 2 of the support 1 admits copying light.

In order to ensure that the prongs 16a of the portion 16 of the hold-down device 8 will bear against the adjacent parts of a properly inserted commodity 100 so that such parts of the commodity will be urged against the upper side of the section 7, the section 9 is further provided with two auxiliary biasing elements 26 which bear against the prongs 16a when the section 9 is moved to its closed or operative position. The auxiliary biasing elements 26 are substantially L-shaped members members each having a first portion or leg 26a secured to the upper side of the section 9 and a second portion or leg 26b extending downwardly through an elongated slot 25 of the section 9 so that the lowermost portion of each leg 26b bears against the respective prong 16a in the operative position of the section 9. The slots 25 are parallel to the adjacent sides of the opening 24 and extend at right angles to the plane of the portion or leg 27b of the biasing element 27. The material of the biasing elements 26 is at least slightly elastic, the same as the material of the biasing element 27. The width of each of the two legs 26b can be only a small fraction of the width of the corresponding leg 26a. The legs 27a and 26a can be riveted or otherwise permanently or removably secured to the section 9.

The improved holder 6 preferably further comprises suitable guide means for commodities 100, e.g., for originals which are to be copied in a photographic copying machine. Such guide means may include several devices of the type shown at 18 and 22', i.e., devices having spring-biased posts provided with larger-diameter heads and cooperating with tension springs. The just mentioned posts (not shown because they can be identical and can be used interchangeably with the posts 19 or 19') are insertable into selected holes 30 of the section 9 so that portions thereof extend into registering holes 31 provided in the section 7. FIG. 1 shows two sets of four holes 30 each in the section 9 outwardly adjacent to the biasing elements 26 and two sets of four holes 31 each in the section 7. The just discussed guide means will be used for proper guidance of relatively long commodities. If the commodities are very large, all or some of the posts can be removed from the holes 30 and from the registering holes 31 so as to enlarge the area which is then available for insertion of a commodity between the hold-down device 8 and the section 7. A large commodity can extend all the way from the guide rail 3 to the guide rail 4. For example, a very large commodity, only one portion of which is to be copied in the machine in which the improved apparatus is installed, can be inserted between the guide rails 3, 4 so that it is overlapped by the prongs 16a and extends all the way to the posts 19 or even beyond the holes 16b if the posts 19 are removed.

When the improved positioning apparatus is to be put to use, the first or lower section 7 is placed onto the upper side of the support 1 so that its opening 13 registers with a portion of the window 2 and its annular magnetizable portions 14 are aligned with the respective electromagnets 5. The section 9 is pivoted to its open or lifted position so that the hold-down device 8 of the holder 6 is readily accessible. A commodity 100 (e.g., an elongated segment or portion of an exposed and developed photographic film or a single film frame) is then inserted between the prongs 16a and the upper side of the section 7 whereby the posts 19 facilitate such insertion because they urge the portion 16 upwardly and away from the section 7. One edge of the commodity 100 can be pushed against the posts 19, and the selected portion of such commodity (namely, that portion which is to be imaged onto photographic paper or the like) is moved into register with the opening 13 and with the corresponding portion of the cutout 17. The prongs 16a urge the inserted commodity 100 against the upper side of the section 7 so that the properly located commodity can be released by the fingers of the attendant. This holds true even if the commodity 100 exhibits a pronounced tendency to curl and/or to undergo other deformation in a sense to convert it into a non-planar body. It has been found that a commodity which is placed below the prongs 16a and below the web of the portion 16 (i.e., close to or all the way into abutment with the posts 19) remains flat or at least substantially flat after the commodity is released by the operator and regardless of the extent to which such commodity tends to curl or undergo other types of deformation.

In the next step, the operator moves the section 9 to its operative position whereby the posts 19' abut against the upper side of the section 7 and maintain the marginal portion 9c at a certain distance above and away from the adjacent marginal portion of the section 7. The legs 26a of the biasing elements 26 bear against the respective prongs 16a to further reduce the likelihood of movement of the commodity from a plane which is exactly parallel to the upper side of the section 7, and the leg 27b of the biasing element 27 bears against the fourth side of that selected portion of the commodity 100 which registers with the window 13 in the section 7 (and hence also with the window 24 as soon as the section 9 is moved to its operative position). The electromagnets 5 are energized by the control unit 105 as soon as the section 9 assumes its operative position but not later than immediately prior to start of the exposure. This ensures that the section 9 is forced against the section 7 in the region of the annular inserts 14 whereby the median portion of the section 9 is caused to exert an even greater force against the hold-down device 8 in a direction to prevent any deformation of the inserted commodity 100, i.e., the commodity remains in an optimum position during the interval allotted for exposure of that portion thereof which overlies the opening 13. The rigidity of the section 9 is sufficient to ensure that the legs 26b and 27b respectively bear against the prongs 16a and directly against the commodity 100 not later than on energization of the electromagnets 5. The portion 16 of the hold-down device 8 then invariably prevents any curling of three sides of the selected portion of a properly inserted commodity 100, and any curling of the fourth side of such selected portion is prevented by the leg 27b of the biasing element 27, i.e., of that element whose leg extends directly into and through the opening 24. Proper positioning of selected portions of commodities (e.g., photographic films) in a predetermined plane is particularly important when the copying machine is to make greatly enlarged reproductions of images on such selected portions.

When the exposure is completed, the control unit 105 is caused to deenergize the electromagnets 5. This enables the posts 19' to at least sligthly increase the distance between the marginal portion 9c of the section 9 and the adjacent marginal portion of the section 7 so that the operator can readily pivot the section 9 to its inoperative position. Thus, an attendant can readily remove the commodity 100 or shift the commodity relative to the hold-down device 8 so as to place another selected portion of the same commodity into register with the opening 13. In fact, the section 9 need not be lifted at all if a portion (e.g., the leader) of a strip-shaped commodity extends from the space between the sections 7 and 9 so that an attendant can simply pull the commodity through a distance corresponding to that between the centers of two neighboring film frames or between the center of a freshly exposed film frame and the center of the next frame which is to be imaged onto photographic paper or the like. The section 9 will be pivoted above and away from the hold-down device 8 if the commodity constitutes a single film frame or if only one frame of a series of coherent film frames must be copied.

In order to facilitate rapid pivoting of the section 9 to and from its operative position, such section can be provided with an elongated lever or handle 28 or an analogous handgrip means. The illustrated handle 28 is an elongated lever which extends transversely of and outwardly from and beyond the marginal portion 9a of the section 9. It is also possible to provide a foot pedal (not shown) which can be manipulated by an attendant and is articulately connected to the handle 28 to effect a pivotal movement of the section 9 to inoperative position in response to depression of the pedal. Such connection between a pedal and the handle 28 is desirable and advantageous because it leaves both hands of the attendant free for manipulation of the commodities.

An important advantage of the improved positioning apparatus is that any tendency of the commodities 100 to curl or to undergo other types of deformation is counteracted already during insertion of the commodities so that the movement of section 9 to its operative position does not entail any shifting of a properly inserted commodity from the position such commodity has assumed while the section 9 was held in the inoperative or open position. Moreover, the properly inserted commodity is biased against the section 7 all the way around the selected portion (which registers with the window 13) as soon as the section 9 is pivoted to its operative position. This further reduces the likelihood of undesirable shifting or deformation of the commodity in the course of the copying operation. On the the other hand, and since the cutout 17 of the portion 16 of the hold-down device 8 has an open side 17b, a commodity can be readily withdrawn from the space between the portion 16 and the section 7 and a fresh commodity can be inserted with equal facility.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for positioning sheet-like commodities, particularly for positioning originals in photographic copiers wherein such originals are normally inserted, shifted and/or removed by hand, comprising a support; and a holder on said support, said holder comprising a first section carried by said support and having a first opening, a second section movable with reference to said first section to and from an operative position in which said second section overlies said first section, said second section having a second opening in register with said first opening in the operative position of said second section, a substantially U-shaped hold-down device interposed between said sections and having an open-sided cutout in register with said first opening, a commodity being insertable between said device and said first section so that a selected portion of such commodity overlies said first opening and three sides of the selected portion are held by said device against said first section, and a biasing element provided on said second section and extending along the open side of said cutout in the operative position of said second section to urge the remaining side of the selected portion of a commodity between said device and said first section against said first section.

2. The apparatus of claim 1, wherein at least a portion of said hold-down device consists of elastomeric material and further comprising fastener means securing said hold-down device to said first section so that said device bears against said first section in the region of said cutout therein.

3. The apparatus of claim 1, wherein said biasing element comprises an elastic portion which bears against said first section in the operative position of said second section.

4. The apparatus of claim 1, further comprising means for articulately connecting said second section to said first section so that said second section is pivotable to and from said operative position.

5. The apparatus of claim 1, wherein said cutout has a closed side opposite the open side thereof and said hold-down device comprises an elongated strip-shaped portion extending in substantial parallelism with and adjacent to the closed side of said cutout, and further comprising fastener means securing said strip-shaped portion to said first section.

6. The apparatus of claim 5, wherein said hold-down device further comprises two elastic prongs flanking said cutout intermediate said open and closed sides and extending substantially at right angles to the longitudinal direction of said strip-shaped portion.

7. The apparatus of claim 6, wherein said prongs are integral with said strip-shaped portion of said hold-down device.

8. The apparatus of claim 1, further comprising means for yieldably urging a portion of said hold-down device away from said first section, said second section being arranged to move said portion of said hold-down device toward said first section against the opposition of said urging means when said second section assumes said operative position.

9. The apparatus of claim 8, wherein said cutout has a closed side located opposite the open side thereof and said urging means comprises at least one spring-biased post reciprocably extending through said hold-down device and bearing against said first section in the proximity of the closed side of said cutout.

10. The apparatus of claim 1, wherein said cutout has a closed side located opposite the open side thereof and said hold-down device comprises two elastic prongs flanking said cutout intermediate the open and closed sides thereof, said second section comprising auxiliary biasing elements arranged to urge said prongs against said first section in the operative position of said second section.

11. The apparatus of claim 10, wherein said second section has two elongated slots each overlying a different one of said prongs in the operative position of said second section, said auxiliary biasing elements comprising first portions secured to said second section and second portions extending through the respective slots and bearing against the adjacent prongs in the operative position of said second section.

12. The apparatus of claim 11, wherein said support is substantially horizontal and said second section has an upper side facing away from said first section in the operative position of said second section, said first portions of said auxiliary biasing elements being adjacent to the upper side of said second section.

13. The apparatus of claim 1, further comprising means for forcing said second section toward said hold-down device and said first section in the operative position of said second section.

14. The apparatus of claim 13, wherein at least a portion of said second section consists of magnetizable material and said forcing means comprises magnet means arranged to attract said magnetizable portion so that the second section is urged toward said hold-down device and said first section.

15. The apparatus of claim 14, wherein said magnet means comprises at least one electromagnet installed on said support.

16. The apparatus of claim 15, further comprising means for energizing said electromagnet in the operative position of said second section.

17. The apparatus of claim 15, wherein said first section includes a magnetizable portion disposed intermediate said electromagnet and the magnetizable portion of said second section in the operative position of said second section.

18. The apparatus of claim 17, wherein said magnetizable portion of said first section comprises an annular member consisting of soft iron.

19. The apparatus of claim 14, wherein said magnet means comprises a plurality of electromagnets disposed at the underside of said first section and said first section includes a plurality of magnetizable portions each overlying one of said electromagnets so as to enable such electromagnets to attract the magnetizable portion of said second section in the operative position of said second section.

20. The apparatus of claim 1, wherein said second section has a substantially rectangular outline and further comprising means for articulately connecting one marginal portion of said second section to said first section so that said second section is pivotable to and from said operative position, said second section having a second marginal portion substantially parallel to said one marginal portion and further comprising means for yieldably urging said second marginal portion of said second section away from said first section in the operative position of said second section.

21. The apparatus of claim 20, wherein said urging means comprises a plurality of spring-biased posts reciprocably extending through said second marginal portion and bearing against said first section in the operative position of said second section.

22. The apparatus of claim 1, further comprising removable guide means provided on said second section and extending toward said first section in the operative position of said second section to facilitate the positioning of a commodity in a predetermined position intermediate said hold-down device and said first section.

23. The apparatus of claim 22, wherein said second section has a plurality of holes and said removable guide means comprises posts reciprocably receivable in selected holes of said second section.

24. The apparatus of claim 23, wherein said first section has additional holes in register with the holes of said second section when said second section assumes its operative position so that said posts can extend into the corresponding additional holes on movement of said second section to its operative position.

25. The apparatus of claim 1, wherein said biasing element comprises a substantially L-shaped elastic member having a first leg secured to that side of said second section which faces away from said hold-down device in the operative position of said second section and a second leg extending through said second opening and toward said first section in the operative position of said second section.

* * * * *